(12) United States Patent
Zhou et al.

(10) Patent No.: US 10,136,163 B2
(45) Date of Patent: Nov. 20, 2018

(54) METHOD AND APPARATUS FOR REPAIRING VIDEO FILE

(71) Applicant: Huawei Technologies Co., Ltd., Shenzhen (CN)

(72) Inventors: Jianhui Zhou, Beijing (CN); Ke Wang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 566 days.

(21) Appl. No.: 14/850,376

(22) Filed: Sep. 10, 2015

(65) Prior Publication Data

US 2016/0007048 A1    Jan. 7, 2016

Related U.S. Application Data

(63) Continuation of application No. PCT/CN2013/072390, filed on Mar. 11, 2013.

(51) Int. Cl.
*H04N 7/12*     (2006.01)
*H04N 19/89*    (2014.01)
(Continued)

(52) U.S. Cl.
CPC ........... *H04N 19/89* (2014.11); *H04N 19/172* (2014.11); *H04N 19/40* (2014.11); *H04N 19/463* (2014.11); *H04N 19/50* (2014.11)

(58) Field of Classification Search
CPC ...... H04N 19/89; H04N 19/172; H04N 19/40; H04N 19/463; H04N 19/50
(Continued)

(56) References Cited

U.S. PATENT DOCUMENTS

2007/0116426 A1* 5/2007 Toma ............... G11B 27/005
                                                        386/248
2011/0013701 A1* 1/2011 Henocq .............. H04N 19/89
                                                        375/240.25
(Continued)

FOREIGN PATENT DOCUMENTS

CN      101742334 A    6/2010
CN      101867821 A    10/2010
(Continued)

OTHER PUBLICATIONS

Foreign Communication From a Counterpart Application, PCT Application No. PCT/CN2013/072390, English Translation of International Search Report dated Dec. 12, 2013, 2 pages.
(Continued)

*Primary Examiner* — Farzana Hossain
(74) *Attorney, Agent, or Firm* — Conley Rose, P.C.

(57) ABSTRACT

A method and a device for repairing a video file. The method includes the device generating, if frame data of a video frame can be extracted from a video data stream of a corrupted video file according to a video frame structure feature, a video frame sequence from the extracted frame data of the video frame; recording the CODEC type corresponding to the video frame structure feature, storage location information of the video frame sequence, and index data that is used to record a timestamp-based index of the video frame sequence; determining a sequence header of the video frame sequence; and reconstructing, according to the sequence header, the recorded CODEC type, the recorded storage location information, and the recorded index data, container data that complies with a target container format, and generating and outputting a video file in the target container format based on the reconstructed container data.

9 Claims, 5 Drawing Sheets

(51) Int. Cl.
*H04N 19/172* (2014.01)
*H04N 19/40* (2014.01)
*H04N 19/463* (2014.01)
*H04N 19/50* (2014.01)

(58) Field of Classification Search
USPC .................................................. 375/240.12
See application file for complete search history.

(56) References Cited

U.S. PATENT DOCUMENTS

| | | |
|---|---|---|
| 2011/0090957 A1 | 4/2011 | Liao et al. |
| 2013/0058405 A1 | 3/2013 | Zhao et al. |
| 2013/0294512 A1 | 11/2013 | Song et al. |
| 2014/0032987 A1* | 1/2014 | Nagaraj ............... H04L 65/604 714/747 |

FOREIGN PATENT DOCUMENTS

| | | |
|---|---|---|
| CN | 102045557 A | 5/2011 |
| CN | 102469315 A | 5/2012 |
| CN | 102946534 A | 2/2013 |
| WO | 2012099438 A2 | 7/2012 |
| WO | 2012099440 A2 | 7/2012 |

OTHER PUBLICATIONS

Foreign Communication From a Counterpart Application, PCT Application No. PCT/CN2013/072390, English Translation of Written Opinion dated Dec. 12, 2013, 7 pages.

Foreign Communication From a Counterpart Application, Chinese Application No. 201380000249.6, Chinese Search Report dated Nov. 24, 2015, 2 pages.

Foreign Communication From a Counterpart Application, Chinese Application No. 201380000249.6, Chinese Office Action dated Dec. 2, 2015, 3 pages.

* cited by examiner

METHOD AND APPARATUS FOR REPAIRING VIDEO FILE

CROSS-REFERENCE TO RELATED APPLICATIONS

This application is a continuation of International Application No. PCT/CN2013/072390, filed on Mar. 11, 2013, which is hereby incorporated by reference in its entirety.

TECHNICAL FIELD

The present invention relates to the field of multimedia technologies, and in particular, to a method and an apparatus for repairing a video file.

BACKGROUND

Figure 1:
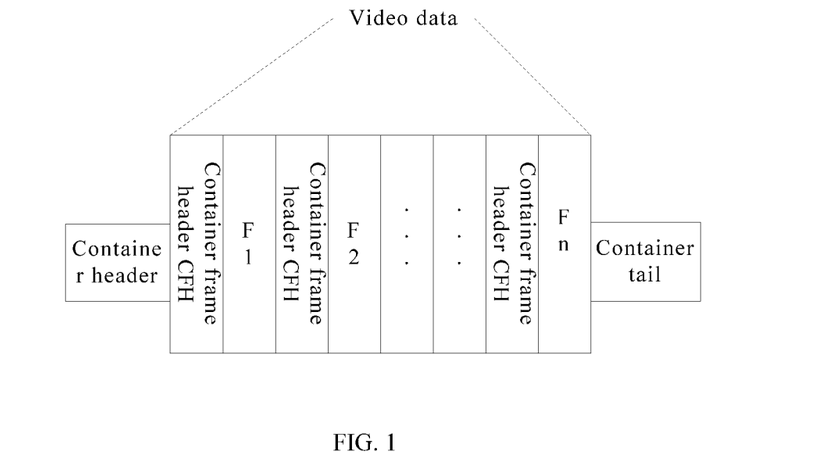
FIG. 1 is a schematic structural diagram of a video data stream encapsulated in a video container as described in the BACKGROUND.

Currently, a video file is usually generated by using a video encapsulation technology to encapsulate video data in a video container, where the video container refers to a file format during video data encapsulation, such as the audio video interleaved (AVI) format and the Moving Picture Experts Group (MPEG)-4 Part 14 (MP4) format. FIG. 1 is a schematic structural diagram of a video file, which includes three parts: container header data, container tail data, and video data. The video data consists of data of several video frames, where a video frame refers to one of many still images that form a moving picture during video playback, and data of one video frame includes container frame header (CFH) data and frame data (for example, F1, F2, and Fn in FIG. 1). The container header data and the container tail data are used to store a coder-decoder (CODEC) type used by the video file, a decoding parameter, and storage location information and index data of the video data, where the index data is used to record a timestamp-based index of frame data of each video frame. The CFH of a video frame is used to store a timestamp of the video frame and storage location information of the video frame, and Fn indicates frame data of an $n^{th}$ video frame and is also referred to as CODEC data of the $n^{th}$ video frame. An aggregate of frame data of each video frame forms a video data stream (that is, a CODEC data stream) after coding. The container header data, the container tail data, and the CFH are collectively referred to as container data.

In the prior art, if a container header data and a container tail data in a video file are corrupted, a video data stream may be sequentially scanned according to various known container formats so as to extract a CFH of each video frame and frame data of each video frame. The container header data and the container tail data are reconstructed according to the CFH and the frame data of each video frame, and a player can normally play the video file according to the reconstructed container header data and container tail data. If the container header data and the container tail data in the video file and the CFH of a video frame are all corrupted, the video file cannot be repaired using the existing video repairing technology, thereby resulting in a low success rate of video file repair in the prior art.

SUMMARY

Embodiments of the present invention provide a method and an apparatus for repairing a video file to improve a success rate of video file repair.

To achieve the foregoing objective, the present invention adopts the following technical solutions.

According to a first aspect, a method for repairing a video file is provided, including generating, if frame data of a video frame can be extracted from a video data stream of a corrupted video file according to a video frame structure feature in a CODEC feature database, a video frame sequence from the extracted frame data of the video frame, where each video frame structure feature corresponds to one CODEC type; recording the CODEC type corresponding to the video frame structure feature, storage location information of the video frame sequence, and index data of the video frame sequence, where the index data is used to record a timestamp-based index of the video frame sequence; determining a sequence header (SH) of the video frame sequence, where the SH includes a decoding parameter used by data in the video frame sequence; and reconstructing, according to the SH, the recorded CODEC type, the recorded storage location information of the video frame sequence, and the recorded index data of the video frame sequence, container data that complies with a target container format, and generating and outputting a video file in the target container format based on the reconstructed container data.

With reference to the first aspect, in a first possible implementation manner of the first aspect, determining whether frame data of a video frame can be extracted from a video data stream of a corrupted video file according to a video frame structure feature in a CODEC feature database includes acquiring a first video frame structure feature from the CODEC feature database, and determining whether a manner of storing data in the video data stream is consistent with the first video frame structure feature; if so, the frame data of the video frame can be extracted from the video data stream of the corrupted video file according to the first video frame structure feature; and if not, acquiring a second video frame structure feature from the CODEC feature database until the frame data of the video frame can be extracted from the video data stream of the corrupted video file using the second video frame structure feature.

With reference to the first aspect or the first possible implementation manner of the first aspect, in a second possible implementation manner of the first aspect, determining an SH of the video frame sequence includes decoding the video frame sequence according to a standard decoder, confirming that the SH is not corrupted if the decoding succeeds, or confirming that the SH is corrupted if the decoding fails; extracting the SH from the video frame sequence according to a format of the video frame sequence if the SH is not corrupted; and reconstructing the SH using a decoding parameter in a predetermined decoding parameter set if the SH is corrupted.

With reference to the second possible implementation manner of the first aspect, in a third possible implementation manner of the first aspect, reconstructing the SH using a decoding parameter in a predetermined decoding parameter set includes acquiring a first decoding parameter from the predetermined decoding parameter set, decoding the video frame sequence according to the first decoding parameter, and determining whether the decoding succeeds according to a decoding result; if the decoding succeeds, reconstructing the SH using the first decoding parameter; and if the decoding fails, acquiring a second decoding parameter from the predetermined decoding parameter set until the video frame sequence can be successfully decoded using the second decoding parameter, and reconstructing the SH using the second decoding parameter.

According to a second aspect, an apparatus for repairing a video file is provided, including an extracting module configured to extract frame data of a video frame from a video data stream of a corrupted video file according to a video frame structure feature in a CODEC feature database, where the video frame structure feature corresponds to one CODEC type; a generating and recording module configured to generate a video frame sequence from the frame data of the video frame extracted by the extracting module, and record the CODEC type corresponding to the video frame structure feature, storage location information of the video frame sequence, and index data of the video frame sequence, where the index data is used to record a timestamp-based index of the video frame sequence; a determining module configured to determine an SH of the video frame sequence generated by the generating and recording module, where the SH includes a decoding parameter used by data in the video frame sequence; and a reconstructing and outputting module configured to reconstruct, according to the SH determined by the determining module, and the CODEC type, the storage location information of the video frame sequence, and the index data that are recorded by the generating and recording module, container data that complies with a target container format, and generate and output a video file in the target container format based on the reconstructed container data.

With reference to the second aspect, in a first possible implementation manner of the second aspect, the determining module includes a determining unit configured to decode the video frame sequence according to a standard decoder, confirm that the SH is not corrupted if the decoding succeeds, or confirm that the SH is corrupted if the decoding fails; an SH extracting unit configured to extract the SH from the video frame sequence according to a format of the video frame sequence if the determining unit determines that the SH is not corrupted; and a reconstructing unit configured to reconstruct the SH using a decoding parameter in a predetermined decoding parameter set if the determining unit determines that the SH is corrupted.

With reference to the first possible implementation manner of the second aspect, in a second possible implementation manner of the second aspect, the reconstructing unit is configured to acquire a first decoding parameter from the predetermined decoding parameter set, decode the video frame sequence according to the first decoding parameter, and determine whether the decoding succeeds according to a decoding result; if the decoding succeeds, reconstruct the SH using the first decoding parameter; if the decoding fails, acquire a second decoding parameter from the predetermined decoding parameter set until the video frame sequence can be successfully decoded using the second decoding parameter, and reconstruct the SH using the second decoding parameter.

According to a third aspect, a device for repairing a video file is provided, including a receiver, a processor, and a memory, where the receiver is configured to receive a corrupted video file; the memory is configured to store an instruction and data and provide the processor with the instruction and the data; and the processor is configured to read the instruction and the data that are stored in the memory and execute the following operations: generating, if frame data of a video frame can be extracted from a video data stream of the corrupted video file according to a video frame structure feature in a CODEC feature database, a video frame sequence from the extracted frame data of the video frame, where each video frame structure feature corresponds to one CODEC type; recording the CODEC type corresponding to the video frame structure feature, storage location information of the video frame sequence, and index data of the video frame sequence, where the index data is used to record a timestamp-based index of the video frame sequence; determining an SH of the video frame sequence, where the SH includes a decoding parameter used by data in the video frame sequence; and reconstructing, according to the SH, the recorded CODEC type, the recorded storage location information of the video frame sequence, and the recorded index data of the video frame sequence, container data that complies with a target container format, and generating and outputting a video file in the target container format based on the reconstructed container data.

With reference to the third aspect, in a first possible implementation manner of the third aspect, the processor being configured to determine an SH of the video frame sequence includes the following configuration. The processor is configured to decode the video frame sequence according to a standard decoder, confirm that the SH is not corrupted if the decoding succeeds, or confirm that the SH is corrupted if the decoding fails; extract the SH from the video frame sequence according to a format of the video frame sequence if the SH is not corrupted; and reconstruct the SH using a decoding parameter in a predetermined decoding parameter set if the SH is corrupted.

With reference to the first possible implementation manner of the third aspect, in a second possible implementation manner of the third aspect, the processor reconstructing the SH using a decoding parameter in a predetermined decoding parameter set includes the following configuration. The processor is configured to acquire a first decoding parameter from the predetermined decoding parameter set, decode the video frame sequence according to the first decoding parameter, and determine whether the decoding succeeds according to a decoding result; if the decoding succeeds, reconstruct the SH using the first decoding parameter; if the decoding fails, acquire a second decoding parameter from the predetermined decoding parameter set until the video frame sequence can be successfully decoded using the second decoding parameter, and reconstruct the SH using the second decoding parameter.

In the embodiments of the present invention, frame data of a video frame is extracted from a video data stream of a corrupted video file according to a video frame structure feature, and a video frame sequence is generated from the extracted frame data of the video frame; a CODEC type corresponding to the video frame structure feature that is used during extraction of the frame data, storage location information of the video frame sequence, and index data that is used to record a timestamp-based index of the video frame sequence are recorded; an SH of the video frame sequence is determined, where the SH includes a decoding parameter used by data in the video frame sequence; and container data that complies with a target container format is reconstructed according to the SH, the recorded CODEC type, the recorded storage location information of the video frame sequence, and the recorded index data of the video frame sequence, and a video file in the target container format is generated and output based on the reconstructed container data. Compared with the prior art, in the process of repairing a video according to this embodiment of the present invention, a CFH does not need to be parsed from the video data stream of the corrupted video file, and therefore the video file can be repaired when container header data and/or container tail data is corrupted, and the corrupted video data stream can be repaired even when the container header data, the container tail data, and the CFH in container data of the corrupted video file are all corrupted, thereby improving a success rate of video repair.

BRIEF DESCRIPTION OF DRAWINGS

To describe the technical solutions in the embodiments of the present invention or in the prior art more clearly, the following briefly introduces the accompanying drawings required for describing the embodiments or the prior art. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

In the embodiments of the present invention, a video data stream of a corrupted video file, which may also be referred to as a corrupted video data stream, can be repaired; particularly when container data in a video data stream is corrupted, the container data can be successfully reconstructed, and the corrupted video data stream is repaired. "Corruption" in the embodiments refers to a data loss or error, for example, corruption of a video file means that partial data in the video file is lost or erroneous, and corruption of a CFH means that data corresponding to the CFH is lost or erroneous. A structure of a video file before corruption is shown in FIG. 1, and container data includes container header data, container tail data, and a CFH. If a video file is corrupted, both the container data and frame data in the video file may possibly be erroneous or lost. In the embodiments of the present invention, only a scenario in which the container data is corrupted is considered, and corruption of the container data may possibly mean that the container header data, the container tail data, and the CFH are all corrupted. The container data is used to store a CODEC type used by the video file, a decoding parameter, index data used to record a timestamp-based index of frame data of each video frame, a timestamp of a video frame, and storage location information of the video frame.

Figure 2A:
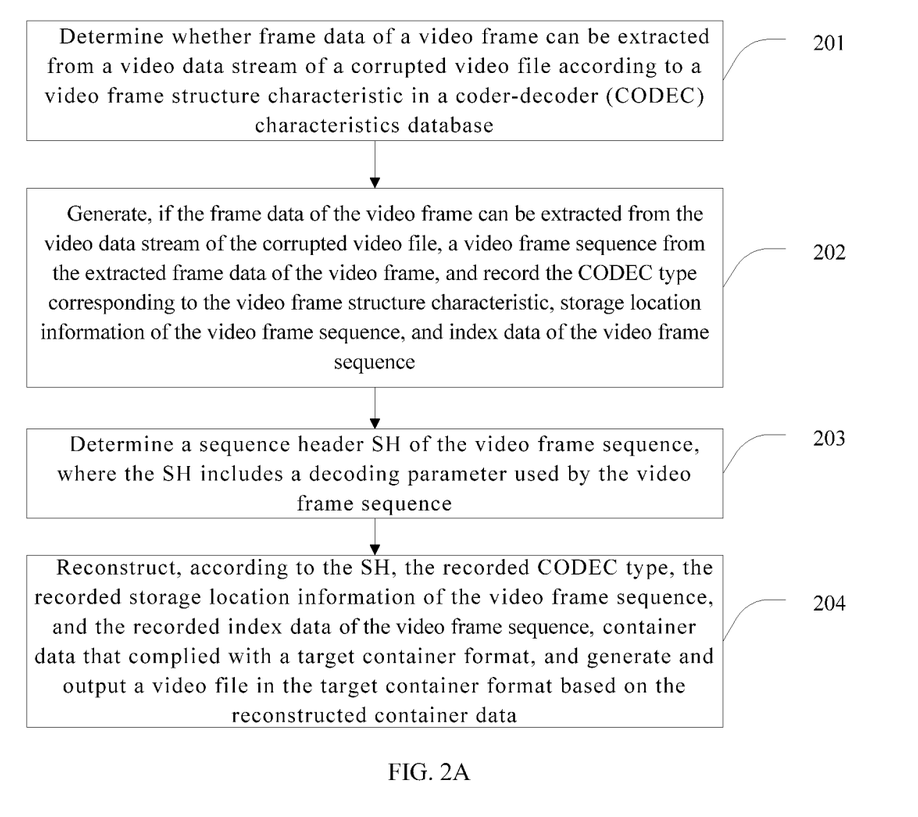
FIG. 2A is a flowchart of a method for repairing a video according to an embodiment of the present invention.

As shown in FIG. 2A, an embodiment of the present invention provides a method for repairing a video, including the following steps.

201. Determine whether frame data of a video frame can be extracted from a video data stream of a corrupted video file according to a video frame structure feature in a CODEC feature database, where the CODEC feature database includes at least one video frame structure feature, and each video frame structure feature corresponds to one CODEC type.

The video data stream is usually a binary data stream.

The CODEC type includes but is not limited to H.264, MPEG-4 technology, or Motion Joint Photographic Experts Group (MJPEG) technology. Video frames obtained after being coded using different CODEC types have different video frame structure features. In this embodiment, at least one video frame structure feature is stored in the preset CODEC feature database, where each video frame structure feature corresponds to one CODEC type. In the following description, two video frame structure features, each corresponding to one CODEC type, are used as examples.

(1) In frame data of a video frame obtained after being coded using H.264, a typical frame header of the H.264 video frame is 00 00 01 XX, where XX includes a frame type, significance of the frame data, and an alignment bit. For example, a typical H.264 I frame header may be 00 00 01 65. A frame tail of each frame has a bit indicating the frame tail. For example, an H.264 frame tail usually has trailing bits, e.g., xxx10000 00000000. (2) An MJPEG frame header starts with FF D8 and a frame tail ends with FF D9.

In the case that at least one video frame structure feature is stored in the CODEC feature database provided in this embodiment, determining whether frame data of each video frame can be extracted from a video data stream according to a video frame structure feature of a CODEC type includes the following steps.

Acquire a first video frame structure feature from the CODEC feature database, and determine whether a manner of storing data in the video data stream is consistent with the first video frame structure feature; if so, the frame data of each video frame can be successfully extracted from the video data stream of the corrupted video file according to the first video frame structure feature; if not, acquire a second video frame structure feature from the CODEC feature database, until a video frame structure feature that can be used to successfully extract the frame data of each video frame from the video data stream of the corrupted video file is found, or until all video frame structure features of CODEC types in the CODEC feature database fail to extract the frame data of each video frame from the video data stream.

When H.264 is used to extract the frame data of each video frame from the video data stream and 00 00 01 XX is detected, it may be assumed that the data is a start position of frame data of an H.264 video frame. When trailing bits are detected, an end position of the frame data of the H.264 video frame can be determined. Then a candidate data segment from the start position to the end position is extracted, and it is confirmed whether the data segment is H.264 video data using a further feature (for example, an alignment bit). In the case that the data segment is H.264 video data, the frame data of each H.264 video frame is extracted from the video data stream based on an H.264 video frame structure feature. If the typical frame header 00 00 01 XX, the trailing bits, or the further feature such as an alignment bit cannot be detected, it indicates that the frame data of each video frame cannot be successfully extracted from the video data stream according to an H.264 video frame structure feature.

When MJPEG is used to extract the frame data of each video frame from the video data stream and FF D8 is detected, it may be determined that the data is a start position of frame data of an MJPEG video frame. When FF D9 is detected, it may be determined that the data is an end position of the frame data of the MJPEG video frame. Then in the case that the data segment is MJPEG video data, frame data of each MJPEG video frame is extracted from the video data stream based on an MJPEG video frame structure feature. If FF D8 or FF D9 cannot be detected, it indicates that the frame data of each video frame cannot be successfully extracted from the video data stream according to an MJPEG video frame structure feature. Extraction of an MPEG4 video frame is similar to that of the MJPEG video frame, and is not described here again.

It should be noted that a video frame structure feature of a CODEC type is not limited to the frame header and frame tail feature data mentioned above and may also include other constant data (for example, FF at a fixed position), an alignment bit (for example, an alignment bit that is inserted at a fixed position and assigned a value 1), and the like in the frame data.

When this step is performed, if the frame data of each video frame can be successfully extracted from the video data stream according to a video frame structure feature of a certain CODEC type, it indicates that the CODEC type is consistent with the CODEC type used during coding of the video data stream.

202. Generate, if the frame data of the video frame can be extracted from the video data stream of the corrupted video file, a video frame sequence from the extracted frame data of the video frame, and record the CODEC type that corresponds to the video frame structure feature used during extraction of the frame data, storage location information of the video frame sequence, and index data of the video frame sequence, where the index data is used to record a timestamp-based index of the video frame sequence.

In this specification, the extracted frame data of each video frame is F1, F2, ..., and Fn shown in FIG. 1. A video frame sequence is generated by arranging each video frame in a same order as each video frame is extracted, for example, according to the order of F1, F2, ..., and Fn, and the video frame sequence is a CODEC data stream.

Figure 3A:
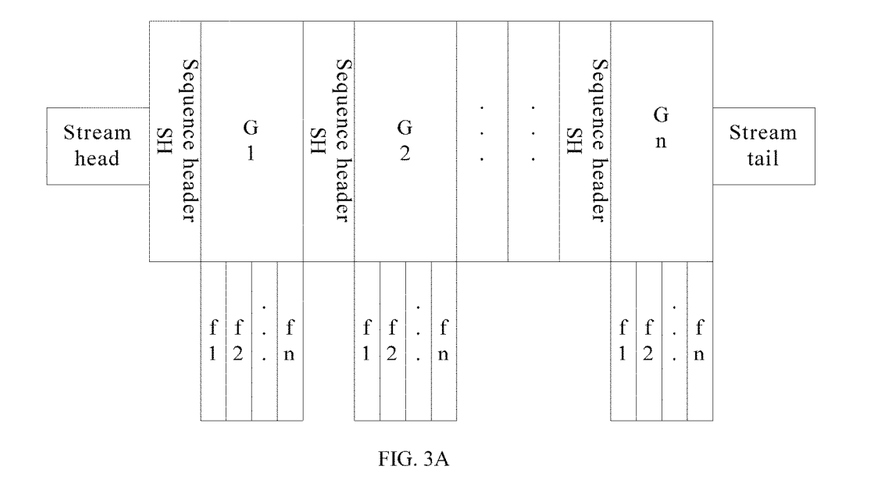
FIG. 3A is a schematic diagram of a format of a CODEC data stream according to an embodiment of the present invention.

A format of a CODEC data stream is shown in FIG. 3A, where a data stream head indicates a data header of the CODEC data stream and is used to store a global parameter describing the CODEC data stream, for example, a CODEC type used by the CODEC data stream. A data stream tail indicates a data tail of the CODEC data stream and is used to store an identifier byte, and the identifier byte may indicate the data tail of the CODEC data stream. An SH of the video frame sequence is used to store a decoding parameter. Gn indicates an $n^{th}$ group of picture (GOP), and fn indicates an $n^{th}$ original video data frame in the GOP. Each GOP has a corresponding SH, each GOP includes frame data of n original video data frames, and the frame data of the original video data frames is data that is not coded and/or compressed.

To help in understanding that the video frame sequence formed by the extracted frame data of each video frame in step 202 is a CODEC data stream, the following description is provided with reference to a specific embodiment.

Figure 3B:
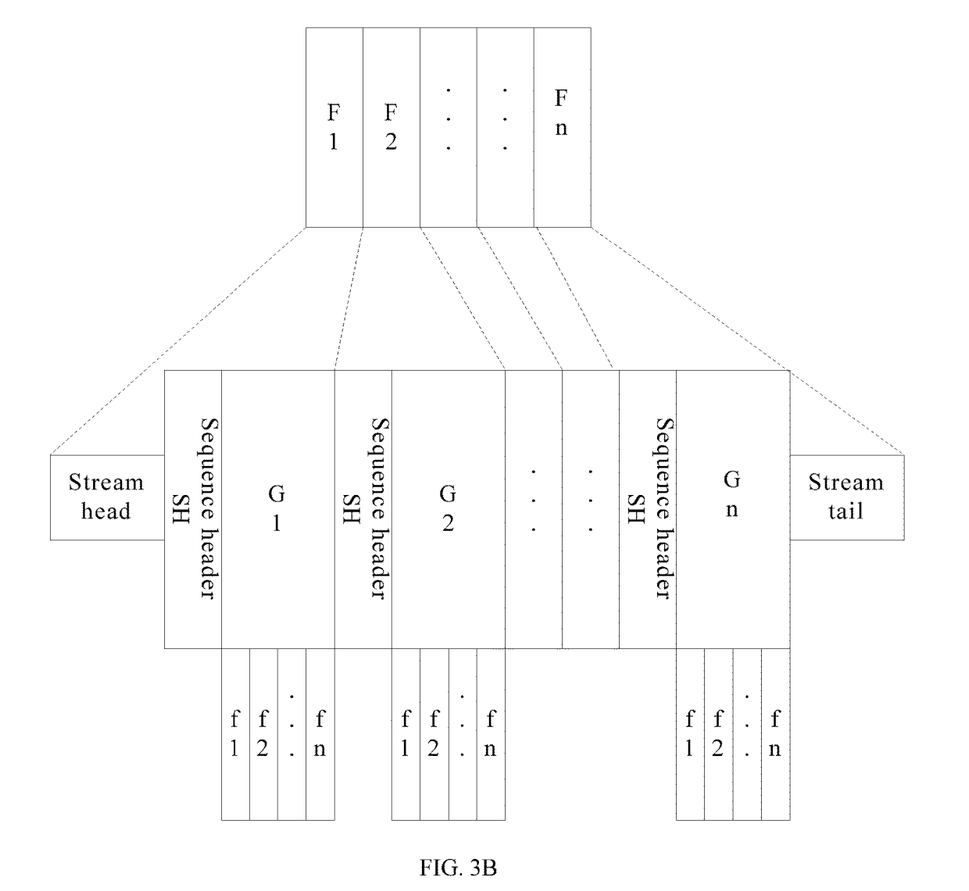
FIG. 3B is a schematic diagram of a correspondence between a video frame sequence (F1, F2, . . . , and Fn) and a CODEC data stream according to an embodiment of the present invention.

For example, as shown in FIG. 3B, the frame data of each video frame, that is, data stored in F1, F2, ..., and Fn is as follows. Frame data stored in F1 is the data stream head, a first SH, and G1 in the CODEC data stream shown in FIG. 3A; frame data stored in F2 is a second SH and G2 in the CODEC data stream shown in FIG. 3A, ...; and frame data stored in Fn is an $n^{th}$ SH, Gn, and the data stream tail in the CODEC data stream shown in FIG. 3A.

After the frame data of each video frame is obtained, the video frame sequence formed by the frame data of each video frame is the CODEC data stream shown in FIG. 3A. It should be noted that FIG. 3B is only one implementation manner, and the following implementation manner, for another example, may also be used. The frame data stored in F1 is the data stream head in the CODEC data stream shown in FIG. 3A; the frame data stored in F2 is the first SH, G1, the second SH, and G2 in the CODEC data stream shown in FIG. 3Aa; ...; and the frame data stored in Fn is the $n^{th}$ SH, Gn, and the data stream tail in the CODEC data stream shown in FIG. 3A. During an actual application, various different implementation manners may also exist, and no limitation is imposed here.

An SH stores a decoding parameter used by a video frame sequence (that is, a CODEC data stream), and the decoding parameter includes one or more of the following parameters: resolution, a compression algorithm, an entropy coding algorithm, a parameter indicating whether field coding is used, or the like, where the field coding is another coding mode different from frame coding.

The resolution may use a common intermediate format (CIF) or D1, and the compression algorithm may use context-based adaptive binary arithmetic coding (CABAC) or the like.

It should be noted that a decoding parameter carried by each SH in a same video frame sequence (that is, a CODEC data stream) may be the same.

During extraction of a video frame, a timestamp and storage location information of the video frame may be obtained in the extraction process, and the index data may be obtained using a timestamp and storage location information of each video frame that are obtained during the extraction of the video frame.

203. Determine an SH of the video frame sequence, where the SH includes the decoding parameter used by the video frame sequence.

A process for determining the SH is described later in detail with reference to FIG. 2B.

204. Reconstruct, according to the SH, the recorded CODEC type, the recorded storage location information of the video frame sequence, and the recorded index data of the video frame sequence, container data that complies with a target container format, and generate and output a video file in the target container format based on the reconstructed container data.

Optionally, a process for reconstructing the container data is as follows.

Write information such as the CODEC type, the storage location information used to describe the storage location of the video frame sequence, and the index data that are recorded in step 202, as well as the decoding parameter that is obtained from the SH determined in step 203 into a specified location of a container header or a container tail according to the target container format, and regenerate a CFH of each video frame according to the timestamp and the storage location information of each video frame that are obtained during extraction of the frame data in step 202.

The target container format may be any standard container format, for example, Audio Video Interleave (AVI), movie digital video technology (MOV), MP4, or Flash Video (FLV).

For example, the target container format is AVI, a video file in the AVI format is output in this step, and a player may normally play the AVI video by reading container data in the AVI video and a decoding parameter in the SH.

It should be noted that the CODEC type, the storage location information of the video frame sequence, the decoding parameter, and the index data in the container data may all be stored in the container header in FIG. 1 or the container tail in FIG. 1. Alternatively, a part of the foregoing data may be stored in the container header in FIG. 1 and the other part is stored in the container tail in FIG. 1, and no limitation is imposed here.

The process of generating and outputting a video file in the target container format based on the reconstructed container data may be performed by following a standard video generation process.

In this embodiment of the present invention, if frame data of a video frame can be extracted from a video data stream of a corrupted video file according to at least one video frame structure feature in a CODEC feature database, a video frame sequence is generated from the extracted frame data of the video frame; a CODEC type corresponding to the video frame structure feature that is used during extraction of the frame data, storage location information of the video frame sequence, and index data that is used to record a timestamp-based index of the video frame sequence are recorded; an SH of the video frame sequence is determined, where the SH includes a decoding parameter used by data in the video frame sequence; and container data that complies with a target container format is reconstructed according to the SH, the recorded CODEC type, the recorded storage location information of the video frame sequence, and the recorded index data, and a video file in the target container format is generated and output based on the reconstructed container data. Compared with the prior art, in this embodiment of the present invention, a video file can be repaired when container header data and/or container tail data is corrupted, and a corrupted video data stream can be repaired even when container header data, container tail data, and a CFH in container data of the corrupted video data stream are all corrupted, thereby improving a success rate of video repair.

Furthermore, in the prior art, a video data stream is scanned using various container formats in sequence, in order to extract a CFH of each video frame and frame data of each video frame. If the CFH of each video frame and the frame data of each video frame cannot be successfully extracted after the video data stream is scanned using a certain container format, another container format needs to be used. A standard container format includes AVI, MOV, MP4, FLV, or the like. Because the number of different container formats exceeds 40, if each container format needs to be used separately for scanning, the process of repairing a corrupted video is time-consuming and cumbersome. In this embodiment, however, frame data of each video frame is extracted from a video data stream using video frame structure features of various CODEC types, and the number of CODEC types is lower than the number of container formats. Therefore, compared with the prior art, in this embodiment of the present invention, complexity of video frame extraction is reduced, and efficiency of the video frame extraction is improved, thereby reducing complexity of repairing a corrupted video file and improving efficiency of repairing the corrupted video file. In addition, if container formats used by the video data stream are unknown container formats, for example, some private container formats are used, the private container formats are usually not made public, and therefore the private container formats cannot be learned in the prior art. In this case, the CFH of each video frame and the frame data of each video frame cannot be successfully extracted, and the corrupted video also cannot be successfully repaired. However, in this embodiment of the present invention, because a CFH does not need to be extracted, the corrupted video data stream can be repaired even when the container header data, the container tail data, and the CFH in the container data of the corrupted video data stream are all corrupted, thereby improving the success rate of repairing the video file.

Figure 2B:
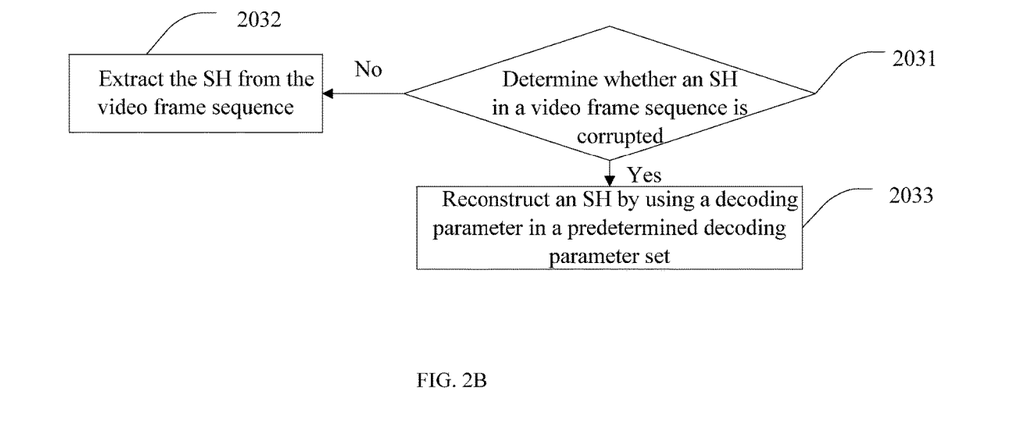
FIG. 2B is a flowchart illustrating implementation of step 203 in FIG. 2A.

Further, as shown in FIG. 2B, in step 203 of FIG. 2A, determining an SH in the video frame sequence formed by the frame data of each video frame may use the following implementation manner.

2031. Determine whether an SH in the video frame sequence is corrupted.

For example, the video frame sequence is decoded using a standard decoder. If the decoding can be performed successfully, it indicates that the SH in the video frame sequence is not corrupted, and if the decoding fails, it indicates that the SH in the video frame sequence is corrupted.

The standard decoder may be a Fast Forward MPEG (FFmpeg) decoder or a VideoLAN Client (VLC) decoder.

2032. If the SH is not corrupted, extract the SH from the video frame sequence according to a format of the video frame sequence.

For example, FIG. 3B is a schematic diagram of a correspondence between a video frame sequence (F1, F2, . . . , and Fn) and a CODEC data stream. The SH stored in the F1 frame is extracted or the SH stored in the F2 frame is extracted with reference to the format of the CODEC data stream shown in FIG. 3A. It may also be an SH stored in another frame, and no limitation is imposed here.

Because the SH includes the decoding parameter used by the video frame sequence and the decoding parameter is required during container data reconstruction, the decoding parameter may be used to reconstruct the container data after the SH is extracted.

2033. If the SH is corrupted, reconstruct an SH using a decoding parameter in a predetermined decoding parameter set.

The various decoding parameters may be stored in a decoding parameter database, and the decoding parameter includes one or more of the following parameters: resolution, a compression algorithm, an entropy coding algorithm, a parameter indicating whether field coding is used, or the like.

The resolution may be CIF or D1, and the compression algorithm may be CABAC or the like.

This step may be implemented in the following manner.

Select a decoding parameter (which may be referred to as a first decoding parameter) from the predetermined decoding parameter set, decode the video frame sequence according to the selected first decoding parameter, and determine whether the decoding succeeds according to a decoding result; if the decoding succeeds, reconstruct the SH using the first decoding parameter; and if the decoding fails, repeat the step of selecting a decoding parameter (which may be referred to as a second decoding parameter) from the predetermined decoding parameter set, and decoding the video frame sequence according to the selected second decoding parameter, until the decoding succeeds or until the decoding fails after all decoding parameters in the predetermined decoding parameter set have been used.

A decoding parameter included in the reconstructed SH is a decoding parameter meeting the condition that a normal video image is obtained after decoding that is performed using the decoding parameter.

It should be noted that the following two cases may usually occur when the video frame sequence is decoded using a decoding parameter.

Case 1: After the decoding, it is informed that the decoding fails, and in this case, another decoding parameter is selected to decode the video frame sequence.

Case 2: A video image is obtained after the decoding, but the video image is distorted because an incorrect decoding parameter is used for decoding. For example, an incorrect decoding parameter cannot restore true colors and textures of the video image, and therefore a decoder obtains an abnormal image, including a monochrome image (pure gray, pure white, pure black, or the like), a full-screen image with artifacts, a noise image, and the like. In this case, a general algorithm for abnormal image recognition (which is beyond the scope of the present invention) needs to be used to further determine whether the video image is normal. For example, it is confirmed whether the decoding succeeds according to whether an image edge characteristic in the decoding result meets a predetermined condition. If the video image obtained after the decoding is abnormal, another decoding parameter is selected to decode the video frame sequence; and if the video image obtained after the decoding is normal, it indicates that the decoding succeeds.

Furthermore, in the prior art, a corrupted video file cannot be repaired when both container data and a CFH in the corrupted video are corrupted, whereas in the method provided in this embodiment of the present invention, a corrupted video file can be repaired when both container data and a CFH in the corrupted video are corrupted.

Figure 4A:
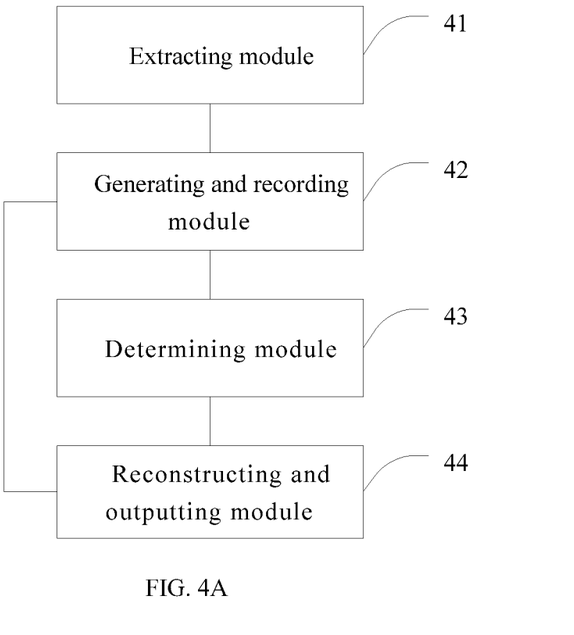
FIG. 4A is a schematic structural diagram of an apparatus for repairing a video file according to an embodiment of the present invention.

Accordingly, as shown in FIG. 4A, an embodiment of the present invention further provides an apparatus for repairing a video file, including an extracting module 41 configured to extract frame data of a video frame from a video data stream of a corrupted video file according to a video frame structure feature in a CODEC feature database, where the video frame structure feature corresponds to one CODEC type, where, the video data stream is usually a binary data stream. The CODEC type includes H.264, MPEG4, or MJPEG. Video frames obtained after being coded using different CODEC types have different video frame structure features. The apparatus further includes a generating and recording module 42 configured to generate a video frame sequence from the frame data of the video frame extracted by the extracting module 41, and record the CODEC type corresponding to the video frame structure feature, storage location information of the video frame sequence, and index data of the video frame sequence, where the index data is used to record a timestamp-based index of the video frame sequence. Optionally, the index data may be obtained using a timestamp and storage location information of each video frame that are obtained during extraction of each video frame. The apparatus further includes a determining module 43 configured to determine an SH of the video frame sequence generated by the generating and recording module 42, where the SH includes a decoding parameter used by data in the video frame sequence. The apparatus further includes a reconstructing and outputting module 44 configured to reconstruct, according to the SH determined by the determining module 43 and the CODEC type, the storage location information of the video frame sequence, and the index data that are recorded by the generating and recording module 42, container data that complies with a target container format, and generate and output a video file in the target container format based on the reconstructed container data.

In this embodiment of the present invention, if frame data of a video frame can be extracted from a video data stream of a corrupted video file according to at least one video frame structure feature in a CODEC feature database, a video frame sequence is generated from the extracted frame data of the video frame; a CODEC type corresponding to the video frame structure feature that is used during extraction of the frame data, storage location information of the video frame sequence, and index data that is used to record a timestamp-based index of the video frame sequence are recorded; an SH of the video frame sequence is determined, where the SH includes a decoding parameter used by data in the video frame sequence; and container data that complies with a target container format is reconstructed according to the SH, the recorded CODEC type, the recorded storage location information of the video frame sequence, and the recorded index data of the video frame sequence, and a video file in the target container format is generated and output based on the reconstructed container data. Compared with the prior art, in the process of repairing a video according to this embodiment of the present invention, a CFH does not need to be parsed from the video data stream of the corrupted video file, and therefore the video file can be repaired when container header data and/or container tail data is corrupted, and the corrupted video data stream can be repaired even when the container header data, the container tail data, and the CFH in container data of the corrupted video file are all corrupted, thereby improving a success rate of video repair.

Furthermore, in the prior art, a video data stream is scanned using various container formats in sequence, in order to extract a CFH of each video frame and frame data of each video frame. If the CFH of each video frame and the frame data of each video frame cannot be successfully extracted after the video data stream is scanned using a certain container format, another container format needs to be used. A standard container format includes AVI, MOV, MP4, FLV, or the like. Because the number of different container formats exceeds 40, if each container format needs to be used separately for scanning, the process of repairing a corrupted video is time-consuming and cumbersome. In addition, if container formats used by the video data stream are unknown container formats, for example, some private container formats are used, the private container formats are usually not made public, and therefore the private container formats cannot be learned. In this case, the CFH of each video frame and the frame data of each video frame cannot be successfully extracted, and the corrupted video also cannot be successfully repaired.

In this embodiment of the present invention, however, frame data of each video frame is extracted from a video data stream using video frame structure features of various CODEC types, and the number of CODEC types is lower than the number of container formats. Therefore, compared with the prior art, in this embodiment of the present invention, complexity of video frame extraction is reduced, and a success rate of the video frame extraction is improved, thereby reducing complexity of repairing a corrupted video file and improving the success rate of repairing the corrupted video file.

For a workflow of the apparatus shown in FIG. 4A, reference may be made to the related description in the foregoing method embodiment.

Figure 4B:
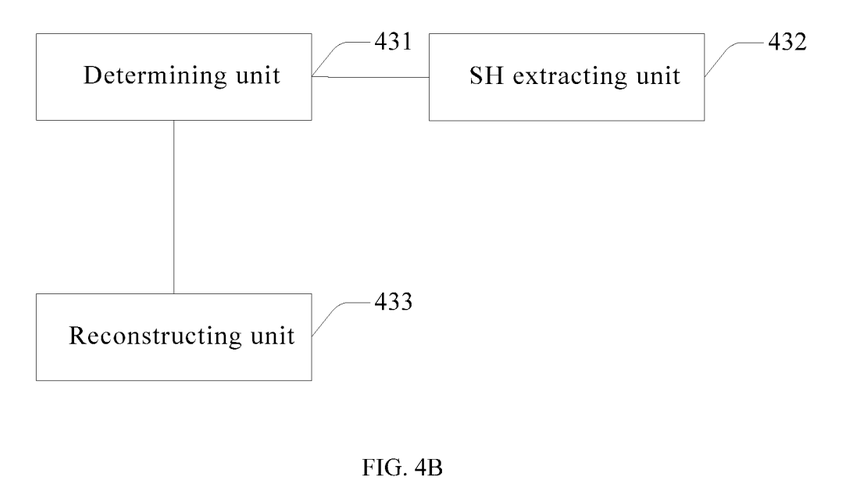
FIG. 4B is a schematic structural diagram of a determining module in FIG. 4A.

Further, as shown in FIG. 4B, the determining module 43 includes a determining unit 431 configured to decode the video frame sequence according to a standard decoder, confirm that the SH is not corrupted if the decoding succeeds, or confirm that the SH is corrupted if the decoding fails; an SH extracting unit 432 configured to extract the SH from the video frame sequence according to a format of the video frame sequence if the determining unit 431 determines that the SH is not corrupted; and a reconstructing unit 433 configured to reconstruct the SH using a decoding parameter in a predetermined decoding parameter set if the determining unit 431 determines that the SH is corrupted.

Further, as shown in FIG. 4B, the reconstructing unit 433 is configured to acquire a first decoding parameter from the predetermined decoding parameter set, decode the video frame sequence according to the first decoding parameter, and determine whether the decoding succeeds according to a decoding result. If the decoding succeeds, reconstruct the SH using the first decoding parameter; if the decoding fails, acquire a second decoding parameter from the predetermined decoding parameter set until the video frame sequence can be successfully decoded using the second decoding parameter, and reconstruct the SH using the second decoding parameter.

For a workflow of the apparatus shown in FIG. 4B, reference may be made to the related description in the foregoing method embodiment.

Furthermore, in the prior art, a corrupted video cannot be repaired when both container data and a CFH in the corrupted video are corrupted. However, a corrupted video file can be repaired using the apparatus provided in this embodiment of the present invention when both container data and a CFH in the corrupted video file are corrupted.

Figure 5:
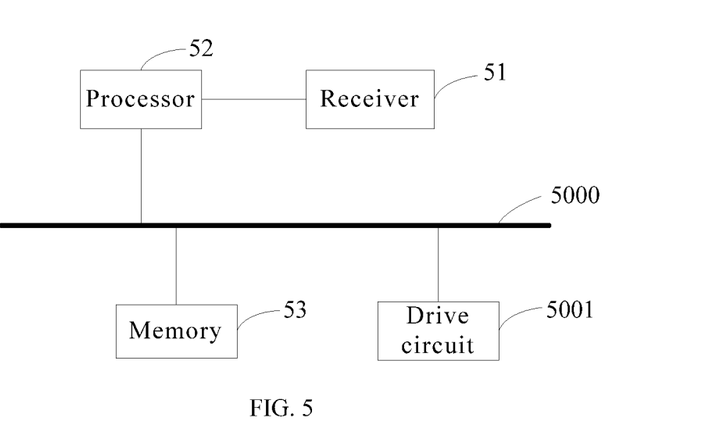
FIG. 5 is a schematic structural diagram of a device for repairing a video file according to an embodiment of the present invention.

As shown in FIG. 5, an embodiment of the present invention further provides a device for repairing a video file, including a receiver 51, a processor 52, a memory 53, a bus 5000, and a drive circuit 5001.

The receiver 51 is configured to receive a corrupted video file.

The memory 53 is configured to store an instruction and data.

The processor 52 is configured to read the instruction and the data that are stored in the memory 53 and execute the following operations. If frame data of a video frame can be extracted from a video data stream of the corrupted video file according to a video frame structure feature in a CODEC feature database, generating a video frame sequence from the extracted frame data of the video frame, where the video frame structure feature corresponds to one CODEC type; recording the CODEC type corresponding to the video frame structure feature, storage location information of the video frame sequence, and index data of the video frame sequence, where the index data is used to record a timestamp-based index of the video frame sequence; determining an SH of the video frame sequence, where the SH includes a decoding parameter used by data in the video frame sequence; and reconstructing, according to the SH, the recorded CODEC type, the recorded storage location information of the video frame sequence, and the recorded index data of the video frame sequence, container data that complies with a target container format, and generating and outputting a video file in the target container format based on the reconstructed container data.

The processor 52 may be an integrated circuit chip and has a signal processing capability. During implementation, each step of the foregoing method can be completed by integrated logic circuits of hardware in the processor or instructions in a form of software. These instructions may run on the processor to execute the method disclosed in the embodiment of the present invention. The processor may be a general processor, a digital signal processor (DSP), an application specific integrated circuit (ASIC), a field programmable gate array (FPGA) or another programmable logic component, a discrete gate or transistor logic component, or a discrete hardware component.

The general processor may be a microprocessor, or the processor may also be any conventional processor, decoder, or the like. The steps of the method disclosed with reference to the embodiment of the present invention may be directly executed and completed by the hardware processor, or executed and completed by a combination of hardware and software modules in the processor. The software module may be located in a mature storage medium in this field, such as a random access memory (RAM), a flash memory, a read-only memory (ROM), a programmable ROM (PROM), an electrically erasable programmable memory, or a register.

The drive circuit 5001 is configured to provide drive for various pieces of hardware in the device for repairing a video file so that the various pieces of hardware can work properly.

Various hardware components of the device for repairing a video file are coupled together through the bus system 5000, where the bus system 5000 further includes a power bus, a control bus, and a status signal bus in addition to a data bus. However, for the purpose of clarity, all buses in FIG. 5 are collectively marked as the bus system 5000.

In this embodiment of the present invention, if the device for repairing a video file can extract frame data of a video frame from a video data stream of a corrupted video file according to a video frame structure feature in a CODEC feature database, a video frame sequence is generated from the extracted frame data of the video frame; a CODEC type corresponding to the video frame structure feature, storage location information of the video frame sequence, and index data of the video frame sequence are recorded; an SH of the video frame sequence is determined, where the SH includes a decoding parameter used by data in the video frame sequence; and container data that complies with a target container format is reconstructed according to the SH, the recorded CODEC type, the recorded storage location information of the video frame sequence, and the recorded index data of the video frame sequence, and a video file in the target container format is generated and output based on the reconstructed container data. Compared with the prior art, in this embodiment of the present invention, a video file can be repaired when container header data and/or container tail data is corrupted, and a corrupted video data stream can be repaired even when container header data, container tail data, and a CFH in container data of the corrupted video data stream are all corrupted, thereby improving a success rate of video repair.

In addition, in the prior art, a video data stream is scanned using various container formats in sequence, in order to extract a CFH of each video frame and frame data of each video frame. If the CFH of each video frame and the frame data of each video frame cannot be successfully extracted after the video data stream is scanned using a certain container format, another container format needs to be used. A standard container format includes AVI, MOV, MP4, FLV, or the like. Because the number of different container formats exceeds 40, if each container format needs to be used separately for scanning, the process of repairing a corrupted video is time-consuming and cumbersome. In addition, if container formats used by the video data stream are unknown container formats, for example, some private container formats are used, the private container formats are usually not made public, and therefore the private container formats cannot be learned. In this case, the CFH of each video frame and the frame data of each video frame cannot be successfully extracted, and the corrupted video also cannot be successfully repaired.

In this embodiment of the present invention, however, frame data of each video frame is extracted from a video data stream using video frame structure features of various CODEC types, and the number of CODEC types is lower than the number of container formats. Therefore, compared with the prior art, in this embodiment of the present invention, complexity of video frame extraction is reduced, and a success rate of the video frame extraction is improved, thereby reducing complexity of repairing a corrupted video file and improving the success rate of repairing the corrupted video file.

Further, the processor 52 being configured to determine an SH of the video frame sequence includes the processor 52 being configured to decode the video frame sequence according to a standard decoder, confirm that the SH is not corrupted if the decoding succeeds, or confirm that the SH is corrupted if the decoding fails; extract the SH from the video frame sequence according to a format of the video frame sequence if the SH is not corrupted; and reconstruct the SH using a decoding parameter in a predetermined decoding parameter set if the SH is corrupted.

The processor 52 reconstructing the SH using a decoding parameter in a predetermined decoding parameter set includes the processor 52 being configured to acquire a first decoding parameter from the predetermined decoding parameter set, decode the video frame sequence according to the first decoding parameter, and determine whether the decoding succeeds according to a decoding result. If the decoding succeeds, reconstruct the SH using the first decoding parameter; if the decoding fails, acquire a second decoding parameter from the predetermined decoding parameter set until the video frame sequence can be successfully decoded using the second decoding parameter, and reconstruct the SH using the second decoding parameter.

For implementation of the device shown in FIG. 5, reference may be made to the related description in FIG. 1.

A person of ordinary skill in the art may understand that each aspect of the present invention or a possible implementation manner of each aspect may be implemented as a system, a method, or a computer program product. Therefore, each aspect of the present invention or the possible implementation manner of each aspect may use forms of a hardware embodiment, a software embodiment (including firmware, resident software, and the like), or an embodiment combining software and hardware, which are collectively called "circuit", "module", or "system" herein. In addition, each aspect of the present invention or the possible implementation manner of each aspect may use a form of a computer program product, where the computer program product refers to computer-readable program code stored in a computer-readable medium.

The computer-readable medium may be a computer-readable signal medium or a computer-readable storage medium. The computer-readable storage medium includes but is not limited to an electronic, magnetic, optical, electromagnetic, infrared, or semi-conductive system, device, or apparatus, or any appropriate combination thereof, such as a RAM, a ROM, an erasable PROM (EPROM or Flash memory), an optical disc, and a portable ROM (CD-ROM).

A processor in a computer reads the computer-readable program code stored in the computer-readable medium so that the processor is capable of executing functions and actions stipulated in each step or a combination of each step in a flowchart and generates an apparatus that implements functions and actions stipulated in each block or a combination of each block in a block diagram.

The computer-readable program code may be completely executed on a computer of a user, partially executed on the computer of the user, functioning as an independent software package, partially executed on the computer of the user and partially executed on a remote computer, or completely executed on the remote computer or a server. It should be further noted that, in some alternative implementation solutions, functions indicated in each step in the flowchart or in each block of the block diagram may not occur in a sequence indicated in the figures. For example, depending on involved functions, two steps or two blocks shown one after another may be executed at a same time in practice, or sometimes the blocks are executed in a reverse sequence.

A person skilled in the art can make various modifications and variations without departing from the spirit and scope of the present invention. Therefore, if these modifications and variations made to the present invention fall within the scope of Claims of the present invention or fall within an equivalent technical scope of the present invention, the present invention also includes these modifications and variations.

What is claimed is:

1. A method for repairing a video file, comprising:
determining that a frame data of a video frame can be extracted from a video data stream of a corrupted video the according to a video frame structure feature information in a coder-decoder (CODEC) feature database, the video frame structure feature information corresponding to one CODEC type;
extracting frame data of the video frame from the video data stream of the corrupted video the according to the video frame structure feature information:
generating a video frame sequence from the frame data;
recording the CODEC type corresponding to the video frame structure feature information, storage location information of the video frame sequence, and index data of the video frame sequence, wherein the index data being used to record a timestamp-based index of the video frame sequence;
determining a sequence header (SH) of the video frame sequence, wherein the SH comprising a decoding parameter used by data in the video frame sequence;
reconstructing, according to the SH, the CODEC type, the storage location information of the video frame sequence, and the index data of the video frame sequence, container data that complies with a target container format; and
generating and outputting a video the in the target container format based on the reconstructed container data.

2. The method of claim 1, wherein determining that the frame data of the video frame can be extracted from the video data stream of the corrupted video file according to the video frame structure feature information in the CODEC feature database comprises:
acquiring a first video frame structure feature information from the CODEC feature database;

determining whether a manner of storing data in the video data stream is consistent with the first video frame structure feature information;

determining that the frame data of the video frame can be extracted from the video data stream of the corrupted video file according to the first video frame structure feature information when the manner of storing data in the video data stream is consistent with the first video frame structure feature information; and acquiring a second video frame structure feature, information from the CODEC feature database until the frame data of the video frame can be extracted from the video data stream of the corrupted video file using the second video frame structure feature information when the manner of storing data in the video data stream is not consistent with the first video frame structure feature information.

3. The method of claim 1, wherein determining the SH of the video frame sequence comprises:

decoding the video frame sequence according to a standard decoder, confirming that the SH is not corrupted when the video frame sequence was successfully decoded, and confirming that the SH is corrupted when the video frame sequence was not successfully decoded;

extracting the SH from the video frame sequence according to a format of the video frame sequence when the SH is not corrupted; and reconstructing the SH using a decoding parameter in a predetermined decoding parameter set when the SH is corrupted.

4. The method of claim 3, wherein reconstructing the SH using the decoding parameter in the predetermined decoding parameter set comprises:

acquiring a first decoding parameter from the predetermined decoding parameter set, decoding the video frame sequence according to the first decoding parameter;

determining whether the video frame sequence was successfully decoded according to a decoding result;

reconstructing the SH using the first decoding parameter when the video frame sequence was successfully decoded;

acquiring a second decoding parameter from the predetermined decoding parameter set until the video frame sequence is successfully decoded using the second decoding parameter when the video frame sequence was not successfully decoded; and reconstructing the SH using the second decoding parameter when the video frame sequence was not successfully decoded.

5. The method of claim 2, wherein determining the SH of the video frame sequence comprises:

decoding the video frame sequence according to a standard decoder, confirming that the SH is not corrupted when the video frame sequence was successfully decoded;

confirming that the SH is corrupted when the video frame sequence was not successfully decoded;

extracting the SH from the video frame sequence according to a format of the video frame sequence when the SH is not corrupted; and reconstructing the SH using a decoding parameter in a predetermined decoding parameter set when the SH is corrupted.

6. The method of claim 5, wherein reconstructing the SH using the decoding parameter in the predetermined decoding parameter set comprises:

acquiring a first decoding parameter from the predetermined decoding parameter set, decoding the video frame sequence according to the first decoding parameter;

determining whether the video frame sequence was successfully decoded according to a decoding result;

reconstructing the SH using the first decoding parameter when the video frame sequence was successfully decoded;

acquiring a second decoding parameter from the predetermined decoding parameter set until the video frame sequence is successfully decoded using the second decoding parameter when the video frame sequence was not successfully decoded; and reconstructing the SH using the second decoding parameter when the video frame sequence was not successfully decoded.

7. A device for repairing a video file, the device comprising:

a receiver configured to receive a corrupted video file; a memory configured to store an instruction and data; and a processor coupled to the receiver and the memory and configured to read the instruction and the data that are stored in the memory and execute the following operations:

determining that a frame data of a video frame can be extracted from a video data stream of a corrupted video file according to a video frame structure feature information in a coder-decoder (CODEC) feature database, the video frame structure feature information corresponding to one CODEC type;

extracting frame data of the video frame from the video data stream of the corrupted video file according to the video frame structure feature information:

generating a video frame sequence from the frame data;

recording the CODEC type corresponding to the video frame structure feature information, storage location information of the video frame sequence, and index data of the video frame sequence, wherein the index data being used to record a timestamp-based index of the video frame sequence;

determining a sequence header (SH) of the video frame sequence, wherein the SH comprising a decoding parameter used by data in the video frame sequence;

reconstructing, according to the SH, the CODEC type, the storage location information of the video frame sequence, and the index data of the video frame sequence, container data that complies with a target container format; and generating and outputting a video file in the target container format based on the reconstructed container data.

8. The device of claim 7, wherein the processor being configured to determine the SH of the video frame sequence comprises the processor being configured to:

decode the video frame sequence according to a standard decoder;

confirm that the SU is not corrupted when the video frame sequence, was successfully decoded; and confirm that the SEE is corrupted when the video frame sequence was not successfully decoded;

extract the SH from the video frame sequence according to a format of the video frame sequence when the SH is not corrupted; and reconstruct the SH using a decoding parameter in a predetermined decoding parameter set when the SH is corrupted.

9. The device of claim 8, wherein the processor being configured to reconstruct the SH using the decoding parameter in the predetermined decoding parameter set comprises the processor being configured to:
  acquire a first decoding parameter from the predetermined decoding parameter set;
  decode the video frame sequence according to the first decoding parameter; and
  determine whether the video frame sequence was successfully decoded according to a decoding result;
  reconstruct the SH using the first decoding parameter when the video frame sequence was successfully decoded;
  acquire a second decoding parameter from the predetermined decoding parameter set until the video frame sequence is successfully decoded using the second decoding parameter when the video frame sequence was not successfully decoded; and
  reconstruct the SH using the second decoding parameter.

\* \* \* \* \*

UNITED STATES PATENT AND TRADEMARK OFFICE
CERTIFICATE OF CORRECTION

PATENT NO. : 10,136,163 B2
APPLICATION NO. : 14/850376
DATED : November 20, 2018
INVENTOR(S) : Jianhui Zhou and Ke Wang It is certified that error appears in the above-identified patent and that said Letters Patent is hereby corrected as shown below:

In the Claims

Column 16, Line 35: "the according" should read "file according"

Column 16, Line 40: "the according" should read "file according"

Column 16, Line 57: "video the" should read "video file"

Column 18, Line 39: "the video" should read "a video"

Column 18, Line 60: "SU" should read "SH"

Column 18, Line 62: "SEE" should read "SH"

Signed and Sealed this
Eighteenth Day of June, 2019

Andrei Iancu
*Director of the United States Patent and Trademark Office*